US012296204B1

(12) United States Patent
Lee

(10) Patent No.: US 12,296,204 B1
(45) Date of Patent: May 13, 2025

(54) DEVICE FOR FIXING ROPE FOR BUILDING CLEANING

(71) Applicant: DYST Inc., Siheung-si (KR)

(72) Inventor: Sang Eun Lee, Siheung-si (KR)

(73) Assignee: DYST Inc., Siheung-si (KR)

( * ) Notice: Subject to any disclaimer, the term of this patent is extended or adjusted under 35 U.S.C. 154(b) by 0 days.

(21) Appl. No.: 18/943,889

(22) Filed: Nov. 12, 2024

(30) Foreign Application Priority Data

Nov. 13, 2023 (KR) ........................ 10-2023-0156045

(51) Int. Cl.
*A62B 35/00* (2006.01)

(52) U.S. Cl.
CPC ................................ *A62B 35/0068* (2013.01)

(58) Field of Classification Search
CPC ..... A62B 35/0068; F16M 11/00; F16M 13/00
See application file for complete search history.

(56) References Cited

U.S. PATENT DOCUMENTS 5,727,646 A * 3/1998 Gray ....................... E04D 15/00 248/237
6,751,921 B1 * 6/2004 Iwakawa ................... E04H 9/14 248/65
6,786,020 B2 * 9/2004 Poldmaa ................. E04D 13/12 52/704
7,163,083 B2 * 1/2007 Argoud ................. E04G 21/329 248/237
9,757,597 B2 * 9/2017 Kotrla ................. E04G 21/3261
2022/0072348 A1 * 3/2022 Satterfield ............ A62B 35/005
2022/0275851 A1 * 9/2022 Sanchez Lopez ...... F16G 11/14

FOREIGN PATENT DOCUMENTS

KR 200186149 Y1 4/2000
KR 20030002540 A 1/2003
KR 200406601 Y1 1/2006
KR 200459687 Y1 3/2012
KR 20170106869 A 9/2017

* cited by examiner

*Primary Examiner* — Monica E Millner
(74) *Attorney, Agent, or Firm* — NKL Law; Jae Youn Kim

(57) ABSTRACT

The present disclosure relates to a device for fixing a rope for building cleaning, including: a body case having a loop-receiving portion formed in an open front surface thereof and a fastener-fitting hole formed on an upper portion of the loop-receiving portion; a loop fastener having a loop-fixing plate, a loop-fitting hole formed on one side of the loop-fixing plate, a rope loop rotatably fitted to the loop-fitting hole, and reinforcing bar-fitting holes formed on the other side of the loop-fixing plate in such a way as to pass through the fastener-fitting hole of the body case and allow a reinforcing bar of a building to be inserted into any one thereof; and a case bracket fixed to the underside of the rear surface of the body case in such a way as to be supported against another reinforcing bar of the building.

8 Claims, 12 Drawing Sheets

DEVICE FOR FIXING ROPE FOR BUILDING CLEANING

CROSS REFERENCE TO RELATED APPLICATION OF THE DISCLOSURE

The present application claims the benefit of Korean Patent Application No. 10-2023-0156045 filed in the Korean Intellectual Property Office on Nov. 13, 2023, the entire contents of which are incorporated herein by reference.

BACKGROUND OF THE DISCLOSURE

Field of the Disclosure

The present disclosure relates to a device for fixing a rope for building cleaning, and more specifically to a device for fixing a rope for building cleaning that is capable of being coupled simply to reinforced bars constituting a wall or post of a building and being cast in concrete in such a way as to be built on the external wall of the building, so that the rope for building cleaning, on which a worker hangs to clean the external wall or window of the building, is locked thereto, thereby ensuring the worker's safety.

Further, the present disclosure relates to a device for fixing a rope for building cleaning that is capable of allowing a body case fixed to a reinforcing bar to be reinforced so that a loop fastener received in the body case moves smoothly according to the pressure generated upon concrete casting, thereby improving the conveniences of use thereof.

Background of the Related Art

To repair the external wall of a high-rise building, construct a facility on the external wall thereof, and clean the external wall having windows, tiles, and the like, generally, a worker goes down from the top of the building, while hanging on a rope, and in this case, the rope is tiedly fixed to the top of the building. To do this, typically, the high-rise building is equipped with a rope-fixing device for hanging the rope thereon.

In this case, a device for fixing a rope for building cleaning should be firmly built in a wall of a building to safely support a worker hanging on the rope.

Generally, the device for fixing a rope for building cleaning is configured to allow a case to be fixedly tied to a steel frame or reinforcing bar located inside a wall of a building to cause a portion of the case to be buried in a wall surface through concrete casting, together with the steel frame or reinforcing bar, so that the device is safely and firmly built in the wall of the building.

To build the device for fixing a rope for building cleaning, that is, concrete is cast to form the external wall or post of the building, and in this case, a portion of the device, to which the rope is tied, is exposed to the external wall of the building, and the remaining portion of the device is tied to the reinforcing bar of the wall of the building and thus buried in the wall of the building.

One of conventional technologies satisfying the above-mentioned conditions is disclosed in Korean Utility Model Registration No. 20-0459687 relating to a device for fixing a rope for building cleaning that includes a body having a concave groove formed on the front surface thereof and an installation hole passing through the rear surface thereof, a fixing piece passing through the installation hole and having a rope loop fastened to the front end thereof to tie the rope thereto and a reinforcing bar-inserting hole formed on the rear end thereof to fixedly insert an auxiliary reinforcing bar located inside the wall of the building, and two brackets protruding from both sides of the rear surface of the installation hole in such a way as to allow the fixing piece inserted into the installation hole to be fixedly attached thereto.

According to the above-mentioned conventional technology, however, the auxiliary reinforcing bar is fixed to vertically arranged reinforcing bars through wires, which causes many inconveniences, and upon concrete casting, further, the body is supported only against the fixing piece tied to the auxiliary reinforcing bar, thereby being varied in position, causing the front surface thereof to be blocked with the concrete, and failing to move the rope loop.

As the device is supported against the wall of the building in the state where the fixing piece is fixed only to the auxiliary reinforcing bar, moreover, the device is not stably fixed to the wall of the building due to losses of wires tied to the auxiliary reinforcing bar and escape of concrete under building aging, thereby ensuring no safety for the worker.

Besides, the body of the device is molded to a relatively thin metal plate, and the rope loop received in the body is pulled out to lock the rope thereonto by the worker. In this case, due to a pouring pressure of a mortar upon concrete casting to form the external wall of the building and an expansion pressure of a volume of concrete in a process where the cast concrete is cured, the sides of the body are concavely deformed in an inward direction where the rope loop is located, so that the rope loop is not pulled out well, thereby failing to lock the rope thereonto, and in this case, if the rope loop is forcedly pulled out, the body may be damaged or broken.

SUMMARY OF THE DISCLOSURE

Accordingly, the present disclosure has been made in view of the above-mentioned problems occurring in the related art, and it is an object of the present disclosure to provide a device for fixing a rope for building cleaning that is capable of being configured to allow a loop fastener to be directly fitted to a reinforcing bar of a building so that a body case is prevented from moving, thereby ensuring the safety of a worker performing the building cleaning.

It is another object of the present disclosure to provide a device for fixing a rope for building cleaning that is capable of being configured to have side plate-reinforcing portions formed on side plates of a body case to prevent the side plates from being deformed even due to the pressure generated upon concrete casting, so that a rope loop moves smoothly.

It is yet another object of the present disclosure to provide a device for fixing a rope for building cleaning that is capable of being configured to allow a case bracket located on the underside of the rear surface of a body case to be simply connected to a reinforcing bar, so that the body case supported against a loop fastener and the case bracket is kept in position even upon concrete casting.

To accomplish the above-mentioned objects, according to the present disclosure, there is provided a device for fixing a rope for building cleaning, including: a body case having a loop-receiving portion formed in an open front surface thereof and a fastener-fitting hole formed on an upper portion of the loop-receiving portion; a loop fastener having a loop-fixing plate, a loop-fitting hole formed on one side of the loop-fixing plate, a rope loop rotatably fitted to the loop-fitting hole, and reinforcing bar-fitting holes formed on the other side of the loop-fixing plate in such a way as to pass through the fastener-fitting hole of the body case and allow a reinforcing bar of a building to be inserted into any one thereof; and a case bracket fixed to the underside of the rear surface of the body case in such a way as to be supported against another reinforcing bar of the building.

According to the present disclosure, desirably, the body case may have at least one or more side plate-reinforcing portions protruding vertically or horizontally from side plates of the loop-receiving portion or protruding vertically and horizontally in the form of a cross from the side plates.

According to the present disclosure, desirably, each side plate of the body case may include a side plate bending prevention bar consisting of a side plate base plate and side plate-fixing plates continuously bent from both sides of the side plate base plate at given inclinations in such a way as to be welded to upper and lower surfaces of the side plate.

According to the present disclosure, desirably, the body case may include fastener-welding plates bent backward to protrude from the edges of the fastener-fitting hole in such a way as to be surface-supported against the loop-fixing plate of the loop fastener inserted into the fastener-fitting hole and fixed thereto by means of welding.

According to the present disclosure, desirably, the body case may be configured to allow the inner wall surface of the loop-receiving portion and the inner wall surface of the fastener-welding plate located on top of the fastener-fitting hole to be placed on the same line as each other, so that the loop-fixing plate inserted into the fastener-fitting hole may be surface-supported against the inner wall surface of the loop-receiving portion.

According to the present disclosure, desirably, the loop fastener may have the reinforcing bar-fitting holes spaced apart from each other on the loop-fixing plate by a distance corresponding to a diameter of the reinforcing bar, so that a horizontal reinforcing bar located on the front or rear surface of a vertical reinforcing bar may pass through any one of the reinforcing bar-fitting holes and be fitted thereto.

According to the present disclosure, desirably, the case bracket may include: a fixing base plate located on one side thereof in such a way as to be welded to the underside of the body case; a locking base plate extending and bent upward from the fixing base plate; and a fitting space portion formed between the body case and the locking base plate, so that a connection member fitted to the reinforcing bar may be fitted to the fitting space portion.

According to the present disclosure, desirably, the connection member may include: a distance-fixing plate whose both ends are bent downward therefrom; a reinforcing bar-fixing portion curvedly formed on one end bent downward of the distance-fixing plate to surround the reinforcing bar; a bracket-fixing portion formed on the other end bent downward of the distance-fixing plate; and a fixing protrusion protruding from the central portion of the bracket-fixing portion in such a way as to correspond to a distance of the fitting space portion.

According to the present disclosure, desirably, the loop fastener may have reinforcing bar-inserting portions open on the undersides of the reinforcing bar-fitting holes of the loop-fixing plate in such a way as to be fitted to top of the reinforcing bar to insert the reinforcing bar into the corresponding reinforcing bar-fitting hole.

According to the present disclosure, desirably, the loop-fixing plate may be configured to allow the width of each reinforcing bar-inserting portion to be smaller than the inner diameter of each reinforcing bar-fitting hole and has an escape prevention projection protruding from the front end periphery of each reinforcing bar-inserting portion connected to the corresponding reinforcing bar-fitting hole, so that the reinforcing bar forcedly inserted into the reinforcing bar-fitting hole may be locked onto the escape prevention projection and prevented from moving to the reinforcing bar-inserting portion.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Figure 1:
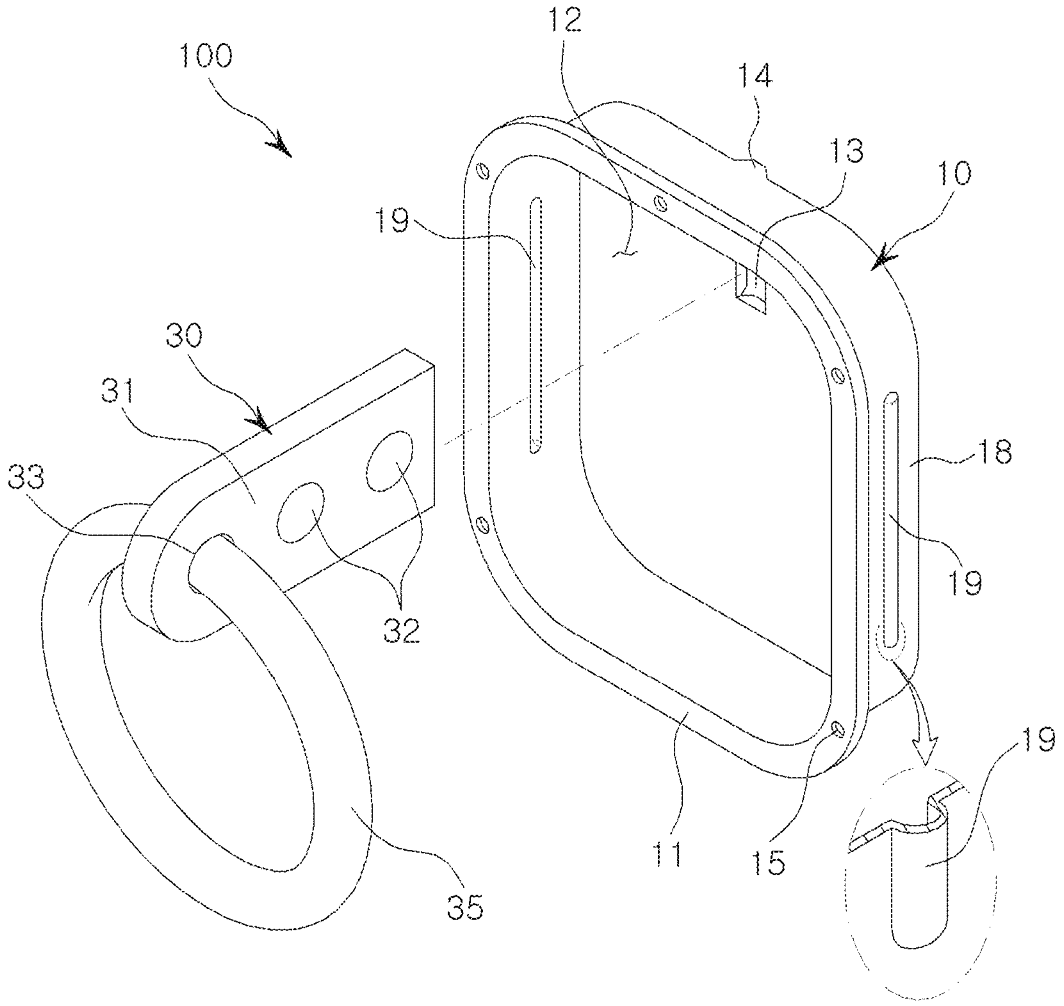
FIG. 1 is an exploded perspective view showing a device for fixing a rope for building cleaning according to an embodiment of the present disclosure.

According to the present disclosure, a device for fixing a rope for building cleaning is capable of being coupled simply to reinforced bars constituting a wall or post of a building and being cast in concrete in such a way as to be built on the external wall of the building, so that the rope for building cleaning, on which a worker hangs to clean the external wall or window of the building, is locked thereto, thereby ensuring the worker's safety.

According to the present disclosure, further, a device for fixing a rope for building cleaning is configured to allow a body case fixed to a reinforcing bar to be reinforced so that a loop fastener received in the body case moves smoothly even under the pressure generated upon concrete casting, thereby improving the conveniences of use thereof.

Hereinafter, an explanation of a device 100 for fixing a rope for building cleaning according to an embodiment of the present disclosure will be given in detail with reference to the accompanying drawings.

Before the present disclosure is disclosed and described, it is to be understood that the disclosed embodiments are merely exemplary of the disclosure, which can be embodied in various forms. Therefore, it should be understood that example embodiments covers all the modifications, equivalents, and alternatives within the idea and technical scope of the disclosure.

First, a device 100 for fixing a rope for building cleaning according to an embodiment of the present disclosure largely includes a body case 10 buried in an external wall of a building, a loop fastener 30 passing through a loop-receiving portion 12 of the body case 10 in such a way as to be fitted to a reinforcing bar 3, and a case bracket 20 fixed to the underside of the body case 10 in such a way as to be supported against a reinforcing bar 3.

The body case 10 has the loop-receiving portion 12 formed in an open front surface thereof, a fastener-fitting hole 13 formed on an upper portion of the loop-receiving portion 12, and a front base plate 11 bent outward from the front edge of the loop-receiving portion 12 in such a way as to come into surface contact with a form 2 for concrete casting to prevent concrete from entering the loop-receiving portion 12.

In this case, a plurality of piece holes 15 are formed spaced apart from one another by a given distance on the front base plate 11, so that nails or fixing pins are inserted into the piece holes 15 on the rear surface of the front base plate 11 surface-contacted with the form 2 to allow the form 2 to be coupled to the front base plate 11, and after concrete curing, desirably, the form 2 is simply separated from the front base plate 11.

Further, the body case 10, which forms the loop-receiving portion 12, is molded to any one of various shapes such as a circle, a square, and a tumbling doll according to the shapes of the loop fastener 30 and a rope loop 35 as will be discussed later. According to the present disclosure, the body case 10 has the shape of a square.

Further, the body case 10, which is buried in the external wall of the building, is configured to allow the pressure of the concrete to be transmitted to a top plate, a bottom plate, and side plates 18, which have relatively low section thicknesses, and in this case, a loop-fixing plate 31 of the loop fastener 30 is supported against the top plate so that no interference occurs. However, the side plates 18 are easily deformed due to the pressure of the concrete, and in this case, side plate-reinforcing portions 19 are formed to prevent the side plates 18 from being deformed.

The side plate-reinforcing portions 19 formed on the side plates 18 of the body case 10 protrude vertically from the side plates 18 of the loop-receiving portion 12, and in this case, at least one or more side plate-reinforcing portions 19 are formed on the corresponding side plate 18, thereby improving the stiffness of the corresponding side plate 18 against the pressure generated from external force.

Further, each side plate-reinforcing portion 19 protrudes in the form of an arch, thereby improving the efficiency in machining, and otherwise, it may protrude as a plurality of circular convex shapes continuously formed in a vertical direction on the corresponding side plate 18.

Figure 7A:
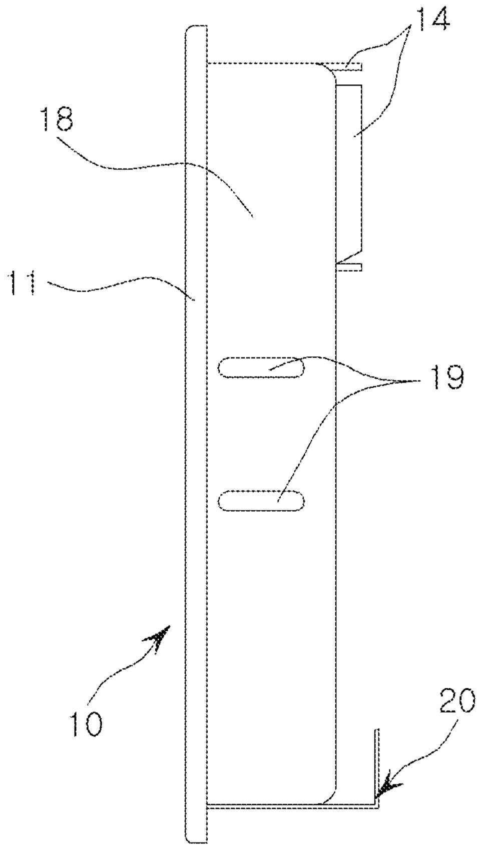
FIGS. 7A to 7C are side views showing examples of a body case of the device for fixing a rope for building cleaning according to the embodiment of the present disclosure.
Figure 7B:
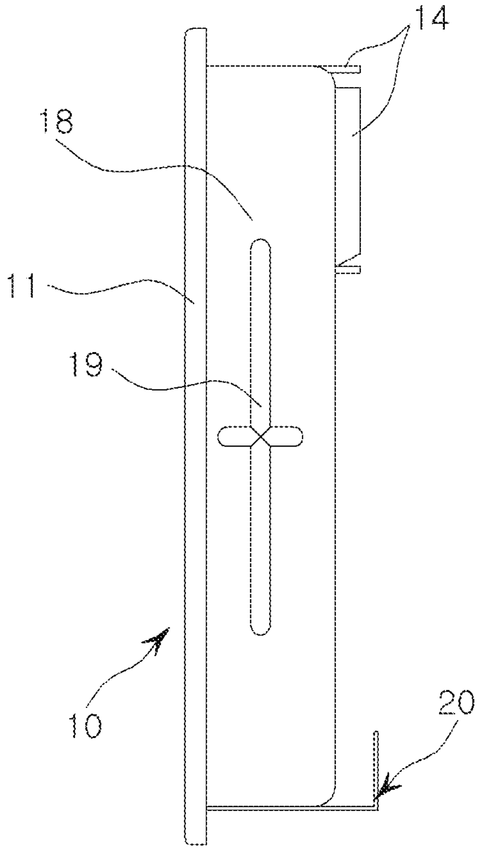

Otherwise, as shown in FIG. 7A, at least one or more side plate-reinforcing portions 19 protrude horizontally from the corresponding side plate 18, and further, as shown in FIG. 7B, each side plate-reinforcing portion 19 protrudes vertically and horizontally in the form of a cross from the corresponding side plate 18, thereby improving the stiffness of the corresponding side plate 18 against the pressure generated from external force and the efficiency in machining.

Figure 7C:
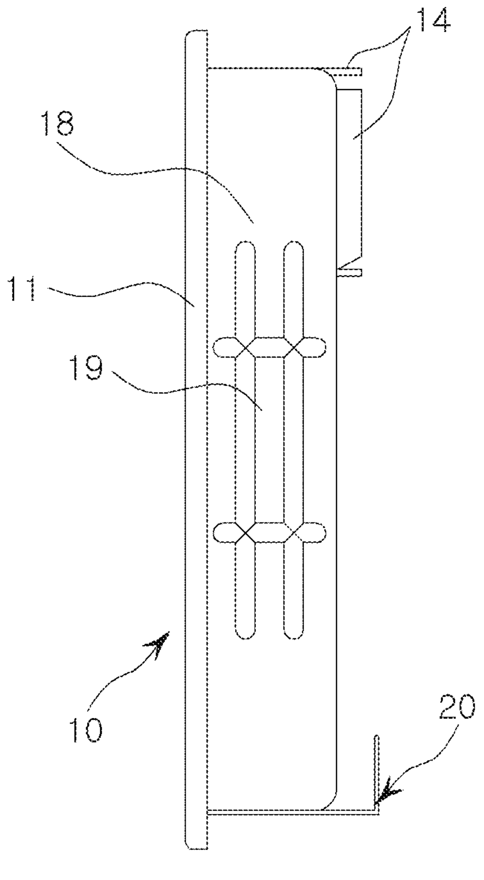

Further, as shown in FIG. 7C, each side plate-reinforcing portion 19 protrudes vertically and horizontally in the form of a plurality of crosses from the corresponding side plate 18.

Figure 2:
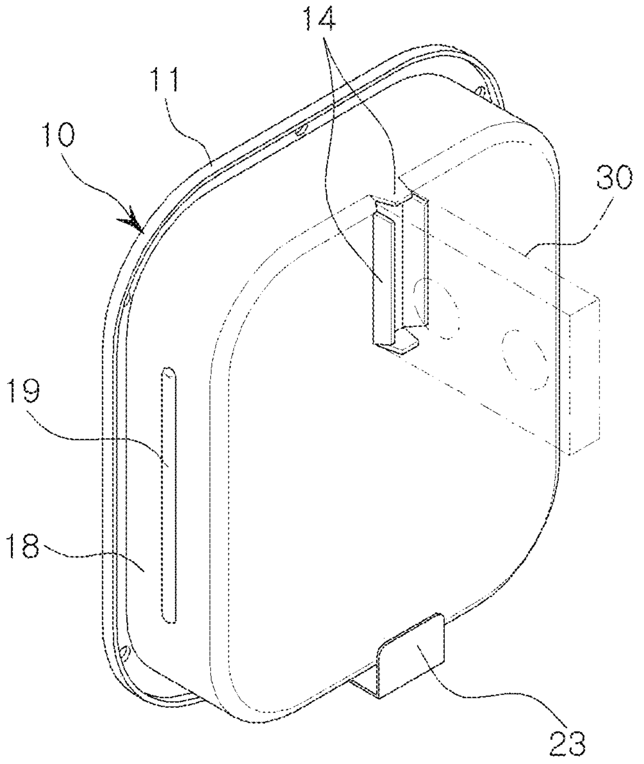
FIG. 2 is a rear perspective view showing the device for fixing a rope for building cleaning according to the embodiment of the present disclosure.
Figure 3:
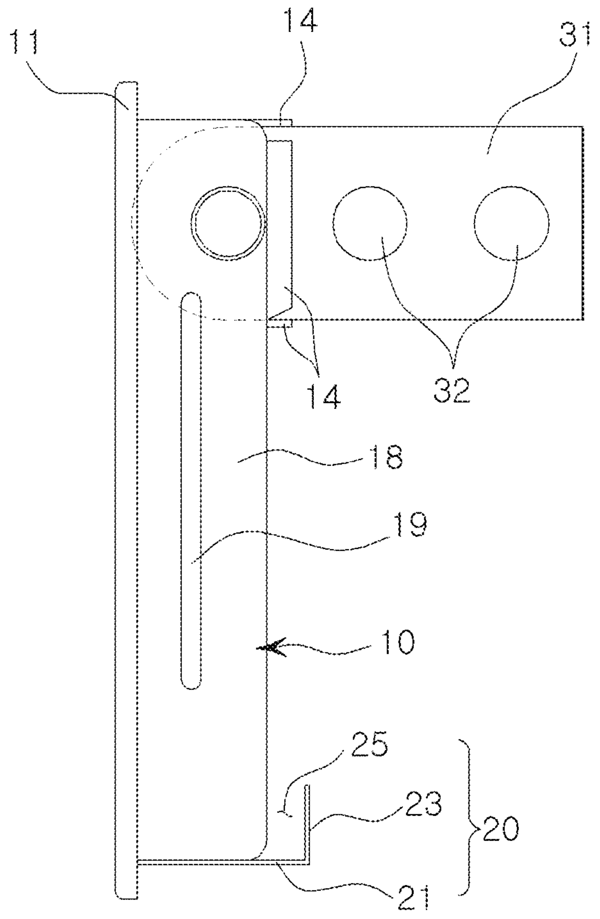
FIG. 3 is a side view showing the device for fixing a rope for building cleaning according to the embodiment of the present disclosure.
Figure 4:
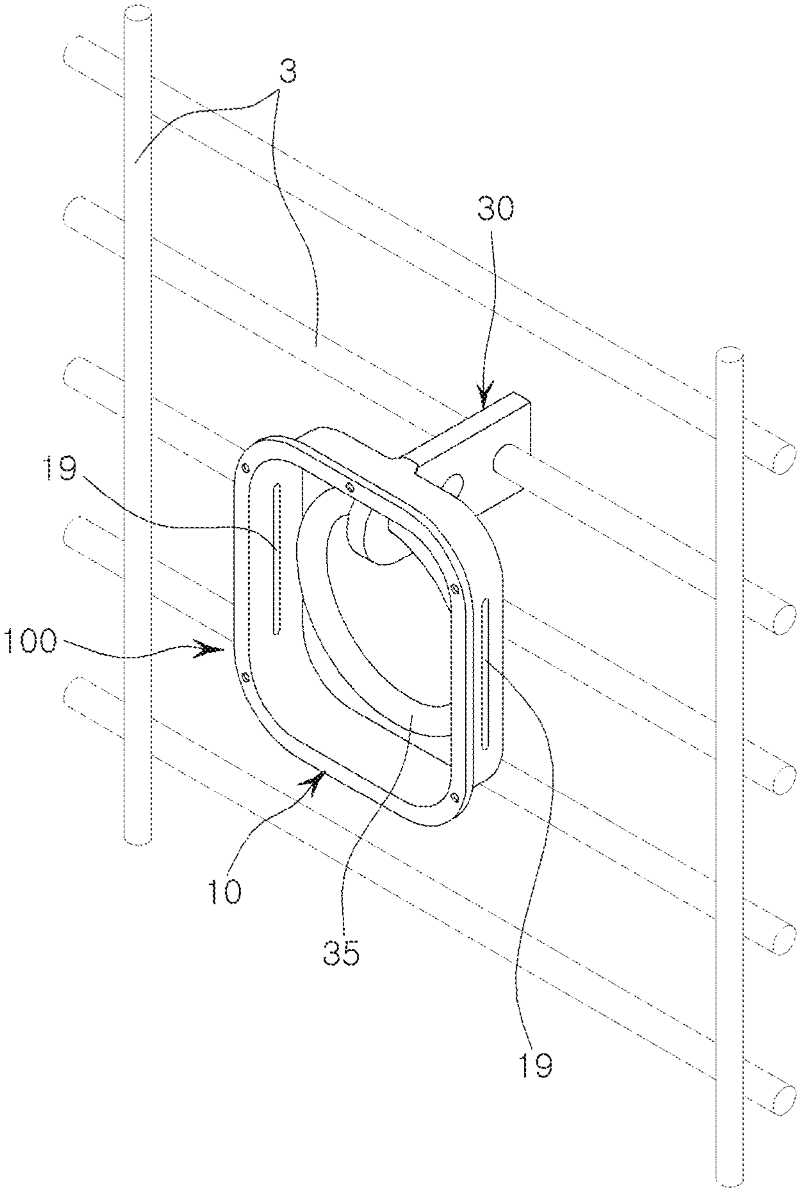
FIG. 4 is a perspective view showing a state wherein the device for fixing a rope for building cleaning according to the embodiment of the present disclosure is built.
Figure 5:
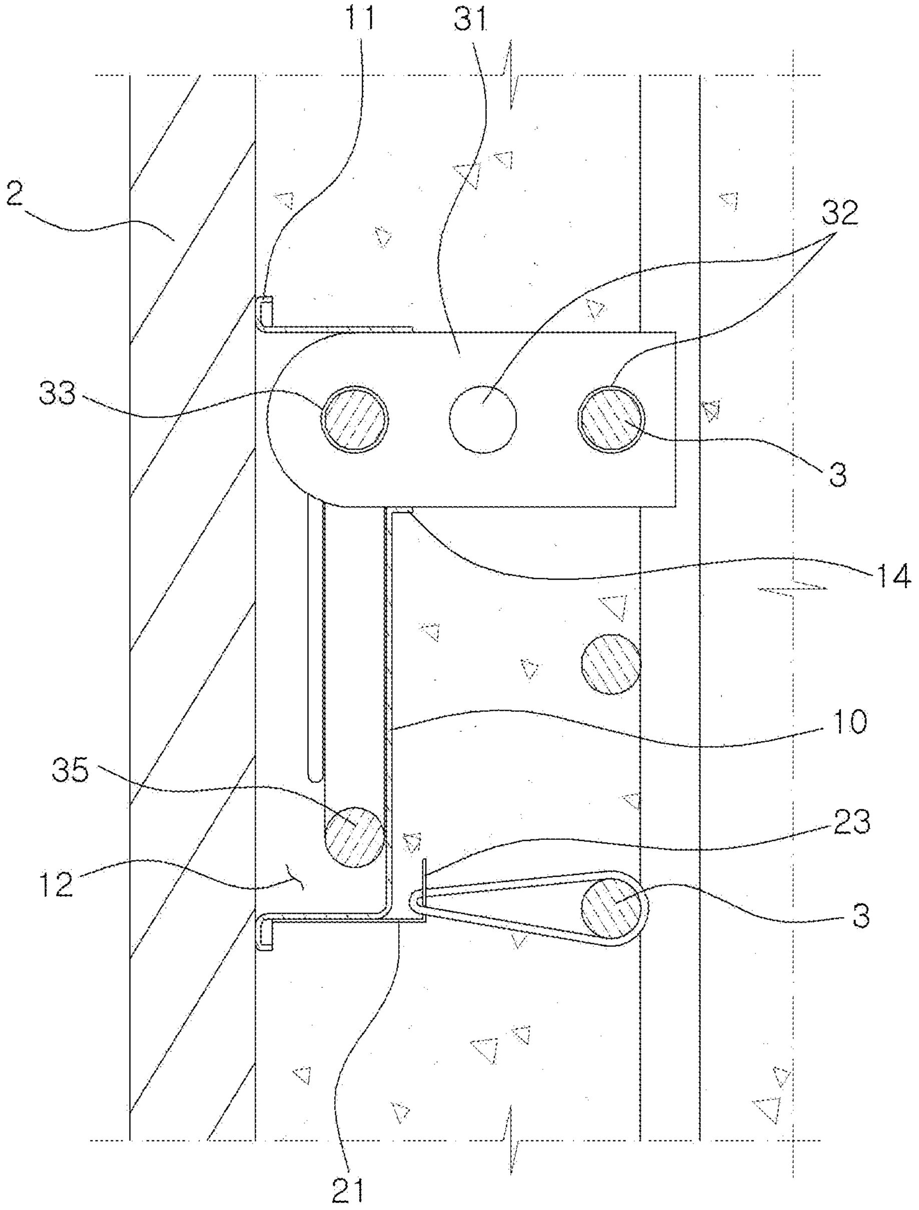
FIG. 5 is a side view showing the state wherein the device for fixing a rope for building cleaning according to the embodiment of the present disclosure is built.
Figure 6:
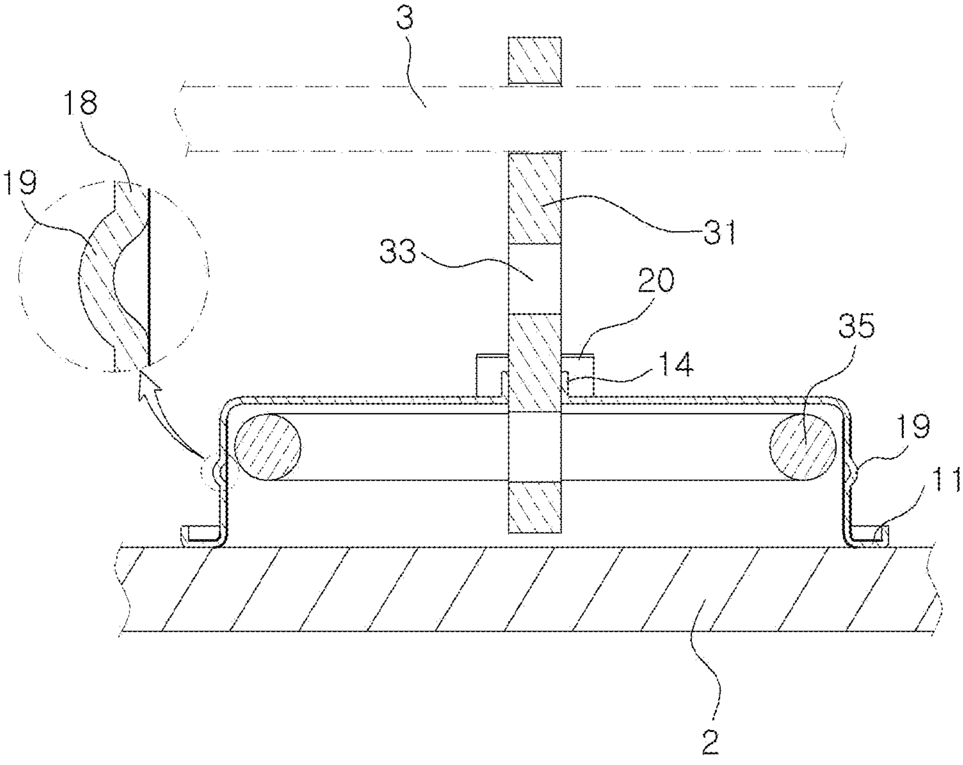
FIG. 6 is a plan sectional view showing the state wherein the device for fixing a rope for building cleaning according to the embodiment of the present disclosure is built.

Further, as shown in FIGS. 2 and 3, the body case 10 has fastener-welding plates 14 bent backward to protrude from the edges of the fastener-fitting hole 13 in such a way as to be surface-supported against the loop-fixing plate 31 of the loop fastener 30 inserted into the fastener-fitting hole 13 and fixed thereto by means of welding.

In this case, as shown in FIG. 3, the body case 10 is configured to allow the inner wall surface of the loop-receiving portion 12 and the inner wall surface of the fastener-welding plate 14 located on top of the fastener-fitting hole 13 to be placed on the same line as each other, so that top of the loop-fixing plate 31 inserted into the fastener-fitting hole 13 is supported against the inner wall surface of the loop-receiving portion 12, thereby enabling the body case 10 to be supported against the loop fastener 30 more stably.

The loop fastener 30 has a loop-fitting hole 33 formed on one side of the loop-fixing plate 31 having the shape of a rectangular plate corresponding to the fastener-fitting hole 13 in such a way as to allow the rope loop 35 to be rotatably fitted thereto and reinforcing bar-fitting holes 32 formed on the other side of the loop-fixing plate 31 as the front end passing through the fastener-fitting hole 13 of the body case 10 in such a way as to insert the reinforcing bars 3 of the building thereinto.

The rope loop 35 fitted to the loop-fixing plate 31 has a smaller section diameter than the loop-fitting hole 33 and a smaller outer diameter than a horizontal width of the loop-receiving portion 12, so that in the state where the rope loop 35 is received in the loop-receiving portion 12 of the body case 10, it is pulled by a worker and thus connected to the rope.

Further, the body case 10 has a front cover (not shown) for covering the loop-receiving portion 12, and in this case, the front cover has cover lockers located on both sides thereof in such a way as to be locked onto concave grooves of the side plate-reinforcing portions 19 to cover the loop-receiving portion 12.

Otherwise, cover-fixing pins detachably attached to the piece holes 15 are inserted into the front base plate 11 of the body case 10 in such a way as to support the front cover thereagainst to thus cover the loop-receiving portion 12, and if necessary, it is possible that the front cover is separated to use the rope loop 35.

Further, the loop fastener 30 has the reinforcing bar-fitting holes 32 spaced apart from each other on the loop-fixing plate 31 by a distance corresponding to a diameter of the reinforcing bar 3, so that the body case 10 is easily adjusted in position to allow the front base plate 11 to be supported against the form 2 for forming the wall of the building.

That is, as the reinforcing bars 3 built in the wall of the building, horizontal reinforcing bars 3 are arranged on the front or rear surfaces of vertical reinforcing bars 3 and fixed thereto by means of wires. In this case, the reinforcing bar-fitting hole 32 is fitted to one of the horizontal reinforcing bars 3 fixed to the front or rear surfaces of the vertical reinforcing bars 3, and therefore, it is easy to adjust the distance of the body case 10 from the form 2 forming the wall of the building, without any deformation of the horizontal reinforcing bar 3 or any additional reinforcing bar.

Further, the case bracket 20 having the shape of a plate is fixed to the underside of the rear surface of the body case 10 by means of welding in such a way as to allow one end thereof to be supported against one reinforcing bar 3 of the building, and through the case bracket 20, therefore, the stability of the body case 10 is improved.

The case bracket 20 includes a fixing base plate 21 located on one side thereof in such a way as to be welded to the underside of the body case 10 and a locking base plate 23 extending and bent upwards from the fixing base plate 21, and in this case, the locking base plate 23 and the horizontal reinforcing bar 3 are fixed to each other by means of a wire. Otherwise, a connection member 40 fitted to the horizontal reinforcing bar 3 is fitted to a fitting space portion 25 formed between the body case 10 and the locking base plate 23.

Figure 8:
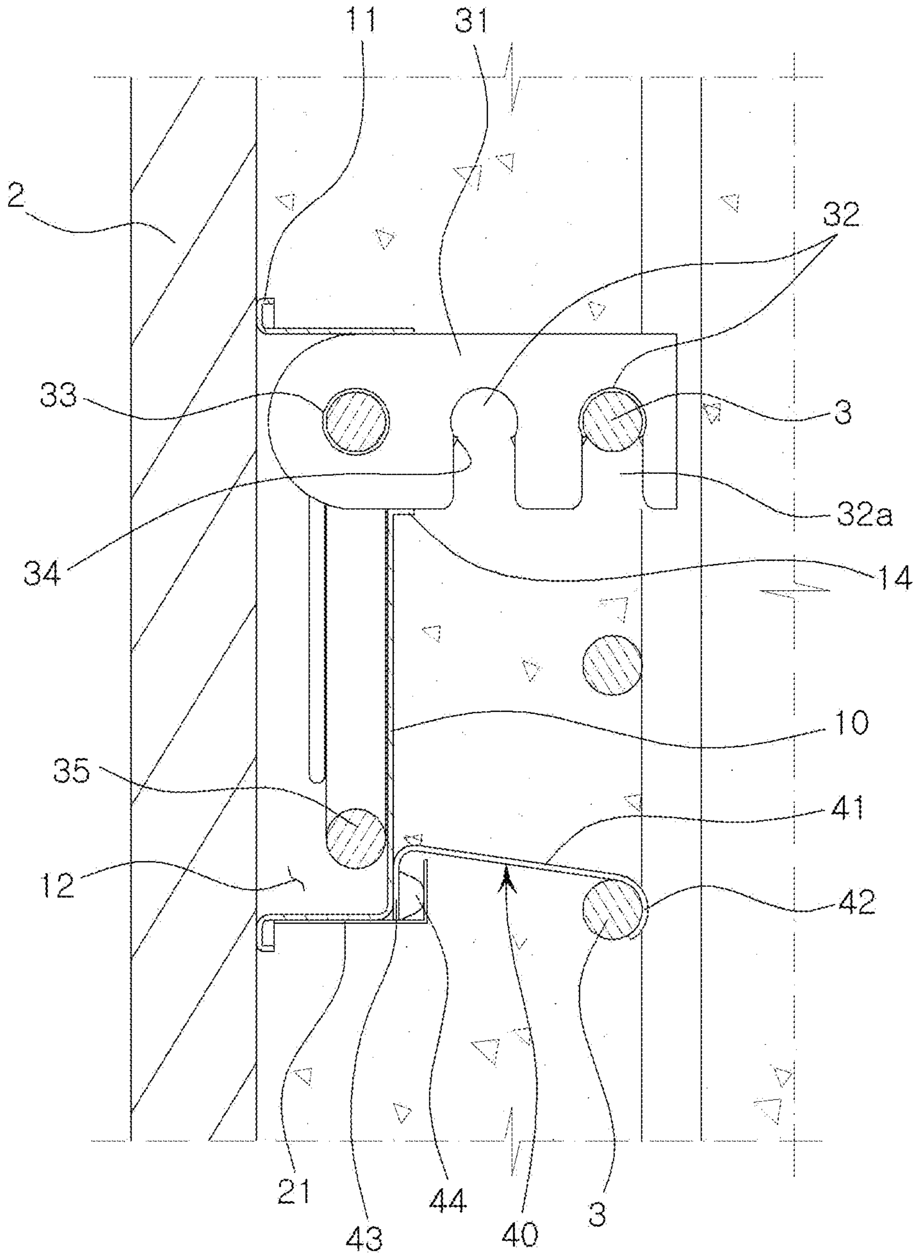
FIG. 8 is a side view showing other examples of a loop fastener and a case bracket of the device for fixing a rope for building cleaning according to the embodiment of the present disclosure.

In this case, as shown in FIG. 8, the connection member 40 includes a plate-shaped distance-fixing plate 41 whose both ends are bent downward therefrom, a reinforcing bar-fixing portion 42 curvedly formed on one end bent downward of the distance-fixing plate 41 to surround the reinforcing bar 3, a bracket-fixing portion 43 formed on the other end bent downward of the distance-fixing plate 41, and a fixing protrusion 44 protruding from the central portion of the bracket-fixing portion 43 in such a way as to correspond to a distance of the fitting space portion 25.

In a state where the loop fastener 30 welded to top of the body case 10 is fitted to the reinforcing bar 3, the connection member 40 is easily fitted to the fitting space portion 25 formed between the body case 10 and the locking base plate 23 and to top of the reinforcing bar 3, so that a distance between the body case 10 and the case bracket 20 is fixed to allow the underside of the front base plate 11 surface-contacted with the form 2 to be stably supported.

In this case, the distance-fixing plate 41 of the connection member 40 has a corrugated portion formed thereon, and if a distance between the fitting space portion 25 and the reinforcing bar 3 is shorter than the distance-fixing plate 41, desirably, the distance-fixing plate 41 is deformed to be bent upward or downward so that the connection member 40 is simply supportedly fitted between the fitting space portion 25 and the reinforcing bar 3.

According to an embodiment of the present disclosure, further, the loop fastener 30 has reinforcing bar-inserting portions 32*a* open on the undersides of the reinforcing bar-fitting holes 32 of the loop-fixing plate 31 in such a way as to be fitted to tops of the reinforcing bars 3 to insert the reinforcing bars 3 into the reinforcing bar-fitting hole 32.

After the horizontal reinforcing bars 3 and the vertical reinforcing bars 3 have been fixed to each other, the corresponding horizontal reinforcing bar 3 is fitted to the reinforcing bar-inserting portion 32*a* of the loop-fixing plate 31, thereby improving conveniences in installation work.

Further, the loop-fixing plate 31 is configured to allow the width of each reinforcing bar-inserting portion 32*a* to be smaller than the inner diameter of each reinforcing bar-fitting hole 32 and has an escape prevention projection 34 protruding from the front end periphery of each reinforcing bar-inserting portion 32*a* connected to the corresponding reinforcing bar-fitting hole 32, so that the reinforcing bar 3 forcedly inserted into the reinforcing bar-fitting hole 32 moves due to the shock generated upon concrete casting, is then locked onto the escape prevention projection 34, and is completely fixed to the reinforcing bar-fitting hole 32, thereby preventing the movement of the body case 10.

Figure 9:
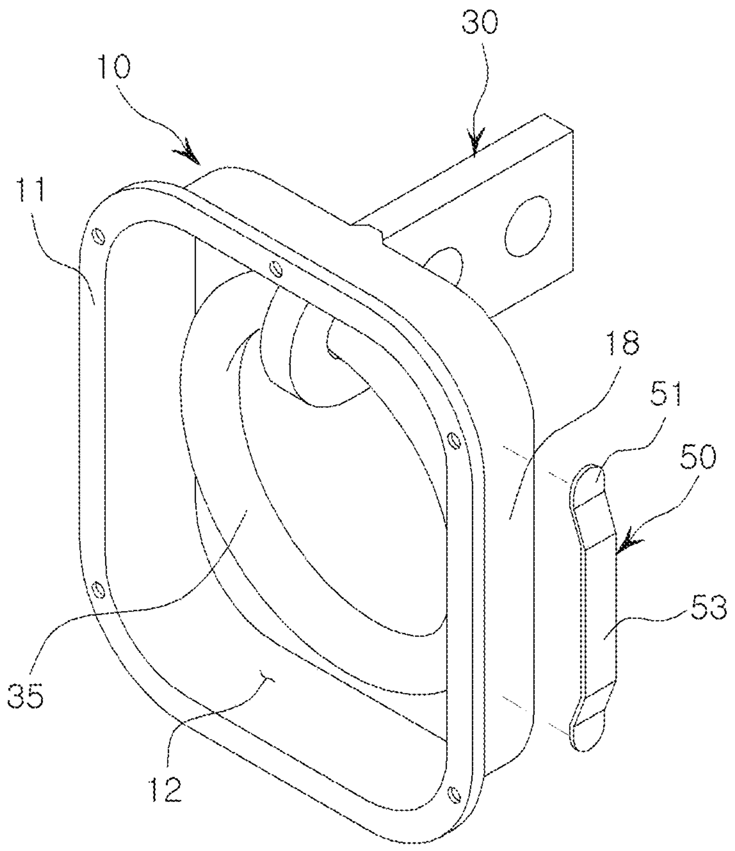
FIG. 9 is a perspective view showing a device for fixing a rope for building cleaning according to another embodiment of the present disclosure.
Figure 10:
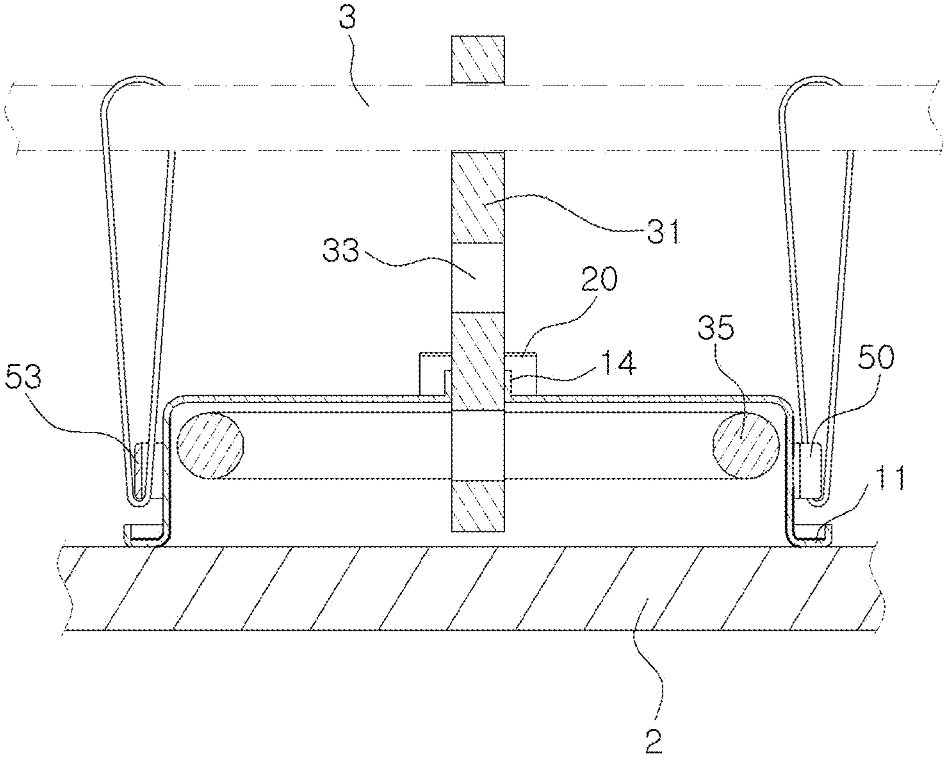
FIG. 10 is a plan sectional view showing a state wherein the device of FIG. 9 is built.

Further, as shown in FIG. 9, side plate bending prevention bars 50 are welded vertically to the side plates 18 of the body case 10, so that the body case 10 is kept in shape under the pressure of the concrete, and in this case, each side plate bending prevention bar 50 has a side plate base plate 53 and side plate-fixing plates 51 continuously bent from both sides of the side plate base plate 53 at given inclinations in such a way as to be welded to upper and lower surfaces of the corresponding side plate 18.

Therefore, the side plate bending prevention bars 50 are welded to a product where no side plate-reinforcing portions are formed on the side plates 18 of the body case 10, thereby preventing the side plates 18 from being deformed, and otherwise, they are welded to a product where the side plate-reinforcing portions are formed on the side plates 18, thereby improving the stiffness of the side plates 18.

Further, it is possible that each side plate bending prevention bar 50 has a base-reinforcing portion protruding from the corresponding side plate base plate 53, thereby improving the stiffness of the side plate base plate 53. Otherwise, the side plate bending prevention bars 50 may be selectively welded to the side plates 18 and the underside plate, thereby improving the stiffness of the side plates 18 or the underside plate of the body case 10.

Further, the side plate base plates 53 of the side plate bending prevention bars 50 fixed to the body case 10 are fixed to the vertical or horizontal reinforcing bar 3 by means of a wire, so that the body case 10 is supported against the reinforcing bar 3 more stably upon the concrete casting.

As described above, the device for fixing a rope for building cleaning according to the present disclosure is configured to allow the loop fastener to be directly fitted to the reinforcing bar of the building so that the device is firmly built in a concrete wall, thereby preventing the body case from moving to ensure the safety of the worker performing the building cleaning.

Further, the device for fixing a rope for building cleaning according to the present disclosure is configured to have the side plate-reinforcing portions formed on the side plates of the body case to prevent the side plates from being deformed due to the pressure generated upon the concrete casting, so that the rope loop located inside the loop-receiving portion can be smoothly pulled or pushed, thereby improving the conveniences of use thereof.

Furthermore, the device for fixing a rope for building cleaning according to the present disclosure is configured to allow the case bracket located on the underside of the rear surface of the body case to be simply connected to the reinforcing bar by means of the connection member, so that top and underside of the body case are supported against the loop fastener and the case bracket to allow the body case to be kept in position even upon concrete casting, thereby making installation work easy and improving a commercial value thereof.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

The invention claimed is:

1. A device for fixing a rope for building cleaning, comprising:

a body case (10) having a loop-receiving portion (12) formed in an open front surface thereof and a fastener-fitting hole (13) formed on an upper portion of the loop-receiving portion (12);

a loop fastener (30) having a loop-fixing plate (31), a loop-fitting hole (33) formed on one side of the loop-fixing plate (31), a rope loop (35) rotatably fitted to the loop-fitting hole (33), and reinforcing bar-fitting holes (32) formed on the other side of the loop-fixing plate (31) in such a way as to pass through the fastener-fitting hole (13) of the body case (10) and allow a reinforcing bar (3) of a building to be inserted into any one thereof; and a case bracket (20) fixed to the underside of the rear surface of the body case (10) in such a way as to be supported against another reinforcing bar (3) of the building, wherein the case bracket (20) comprises a fixing base plate (21) located on one side thereof in such a way as to be welded to the underside of the body case (10), a locking base plate (23) extending and bent upward from the fixing base plate (21), and a fitting space portion (25) formed between the body case (10) and the locking base plate (23), so that a connection member (40) fitted to the reinforcing bar (3) is fitted to the fitting space portion (25), and the connection member (40) comprises a distance-fixing plate (41) whose both ends are bent downward therefrom, a reinforcing bar-fixing portion (42) curvedly formed on one end bent downward of the distance-fixing plate (41) to surround the reinforcing bar (3), a bracket-fixing portion (43) formed on the other end bent downward of the distance-fixing plate (41), and a fixing protrusion (44) protruding from the central portion of the bracket-fixing portion (43) in such a way as to correspond to a distance of the fitting space portion (25).

2. The device according to claim 1, wherein the body case (10) has at least one or more side plate-reinforcing portions (19) protruding vertically or horizontally from side plates (18) of the loop-receiving portion (12) or protruding vertically and horizontally in the form of a cross from the side plates (18).

3. The device according to claim 1, wherein each side plate (18) of the body case (10) comprises a side plate bending prevention bar (50) consisting of a side plate base plate (53) and side plate-fixing plates (51) continuously bent from both sides of the side plate base plate (53) at given inclinations in such a way as to be welded to upper and lower surfaces of the side plate (18).

4. The device according to claim 1, wherein the body case (10) comprises fastener-welding plates (14) bent backward to protrude from the edges of the fastener-fitting hole (13) in such a way as to be surface-supported against the loop-fixing plate (31) of the loop fastener (30) inserted into the fastener-fitting hole (13) and fixed thereto by means of welding.

5. The device according to claim 4, wherein the body case (10) is configured to allow the inner wall surface of the loop-receiving portion (12) and the inner wall surface of the fastener-welding plate (14) located on top of the fastener-fitting hole (13) to be placed on the same line as each other, so that the loop-fixing plate (31) inserted into the fastener-fitting hole (13) is surface-supported against the inner wall surface of the loop-receiving portion (12).

6. The device according to claim 1, wherein the loop fastener (30) has the reinforcing bar-fitting holes (32) spaced apart from each other on the loop-fixing plate (31) by a distance corresponding to a diameter of the reinforcing bar (3), so that a horizontal reinforcing bar (3) located on the front or rear surface of a vertical reinforcing bar (3) passes through any one of the reinforcing bar-fitting holes (32) and is fitted thereto.

7. The device according to claim 1, wherein the loop fastener (30) has reinforcing bar-inserting portions (32*a*) open on the undersides of the reinforcing bar-fitting holes (32) of the loop-fixing plate (31) in such a way as to be fitted to top of the reinforcing bar (3) to insert the reinforcing bar (3) into the corresponding reinforcing bar-fitting hole (32).

8. The device according to claim 7, wherein the loop-fixing plate (31) is configured to allow the width of each reinforcing bar-inserting portion (32*a*) to be smaller than the inner diameter of each reinforcing bar-fitting hole (32) and has an escape prevention projection (34) protruding from the front end periphery of each reinforcing bar-inserting portion (32*a*) connected to the corresponding reinforcing bar-fitting hole (32), so that the reinforcing bar (3) forcedly inserted into the reinforcing bar-fitting hole (32) is locked onto the escape prevention projection (34) and prevented from moving to the reinforcing bar-inserting portion (32*a*).

* * * * *